United States Patent [19]

Reither et al.

[11] 3,788,321

[45] *Jan. 29, 1974

[54] HYPODERMIC SYRINGE WITH IMPROVED ADHESIVE

[75] Inventors: Thomas D. Reither, Pleasant Lake, Mich.; Ralph E. Trease, Toledo, Ohio

[73] Assignee: Owens-Illinois, Inc., Toledo, Ohio

[ * ] Notice: The portion of the term of this patent subsequent to Jan. 18, 1989, has been disclaimed.

[22] Filed: May 7, 1970

[21] Appl. No.: 35,550

Related U.S. Application Data

[62] Division of Ser. No. 693,104, Dec. 26, 1967, Pat. No. 3,635,875.

[52] U.S. Cl. ............................. 128/221, 128/218 N
[51] Int. Cl. ............................................. A61m 5/32
[58] Field of Search ..... 128/214, 214.2, 214.4, 221, 128/218 N, 218 R, 215

[56] References Cited

UNITED STATES PATENTS

| | | | |
|---|---|---|---|
| 3,391,113 | 7/1968 | Clarke et al. | 260/37 EP X |
| 3,131,161 | 4/1964 | Nitzsche | 260/37 SB |
| 3,390,678 | 7/1968 | Bradley et al. | 128/221 |

*Primary Examiner*—Richard A. Gaudet
*Assistant Examiner*—J. C. McGowan
*Attorney, Agent, or Firm*—Donald R. Bahr; W. A. Schaich

[57] ABSTRACT

This invention relates to an adhesive composition which contains at least one bisphenol-A/epichlorohydrin resin, a polyglycol diepoxide resin, dicyandiamide, glycidoxypropyl-trimethoxysilane, and finely divided silica. The subject adhesive is useful in bonding stainless steel to glass.

8 Claims, No Drawings

HYPODERMIC SYRINGE WITH IMPROVED ADHESIVE

REFERENCE TO CROSS-RELATED APPLICATIONS

This application is a division of application Ser. No. 693,104 filed Dec. 26, 1967, now U.S. Pat. No. 3,635,875, Jan. 18, 1972, entitled Adhesive Composition.

THE INVENTION

This invention relates to an adhesive composition which contains at least one bisphenol-A/epichlorohydrin resin, a polyglycol diepoxide resin, dicyandiamide, glycidoxypropyltrimethoxysilane, and finely divided silica. The subject adhesive is useful in bonding stainless steel to glass.

The invention at hand is particularly concerned with an adhesive that is useful for securing stainless steel needles to glass syringe barrels.

The adhesive of the invention could generally be described as an epoxy base adhesive. Epoxy base adhesives are known in the art. However, these prior art adhesives are disadvantageous in that they tend to degrade and hence lose their adhesive properties when exposed to temperatures in excess of 200°F. This problem is evident where the articles in question must be sterilized by exposure to temperatures in excess of 200°F. The problem as discussed above is particularly acute with hypodermic syringes wherein the hypodermic needle is secured to the syringe barrel with an adhesive. The adhesive of this invention is readily adapted to securing stainless steel to glass. Likewise, this adhesive will withstand temperatures in excess of 200°F. for extended periods of time.

The primary object of this invention is an adhesive composiition which can withstand temperatures in excess of 200°F.

Another object of this invention is an adhesive which is particularly adapted to securing stainless steel to glass.

Still another object of this invention is to provide composite glass and metal articles which are secured with the adhesive of this invention.

Another object is a hypodermic syringe wherein a stainless steel needle is secured in a glass syringe barrel with the adhesive of this invention.

Finally, the objects of this invention include all the other novel features which will be obvious from the specification and claims at hand.

The adhesive composition of this invention incorporates resinous components as specified in Formulae I-V.

The adhesive composition of this invention can incorporate from about 45 to about 70 percent by weight of an epoxy resin of the bisphenol-A/epichlorohydrin type, as represented in Formula I:

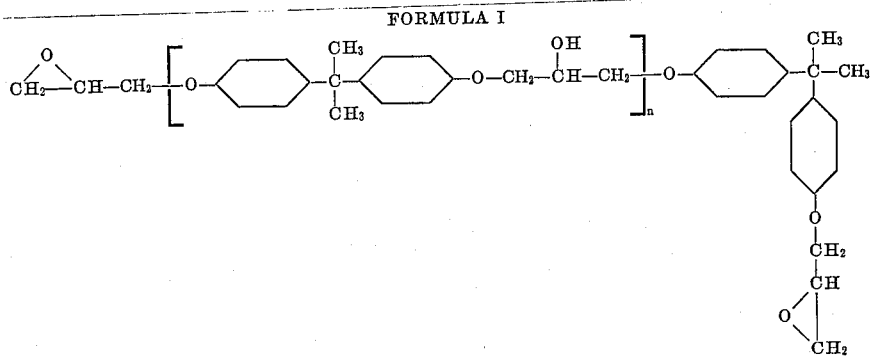

FORMULA I wherein $n$ is about 0.5.

In addition to the above specified ranges for the composition of Formula I, the adhesive composition of this invention can contain from about 5 to about 15 percent by weight of an epoxy resin of the bisphenol-A/epichlorohydrin type as represented in Formula II:

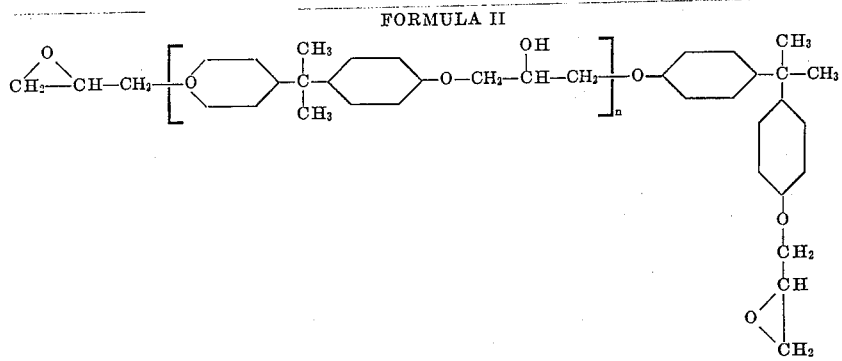

FORMULA II wherein $n$ is about 1.5.

The subject adhesive composition likewise contains from about 5 to about 30 percent by weight of an epoxy resin of the polyglycol diepoxide type as represented in Formula III:

FORMULA III

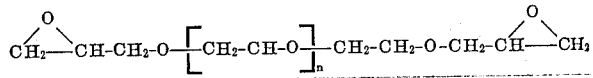

wherein $n$ has a value of from about 3 to about 5.6.

In addition to the above-specified epoxy resin components, the subject adhesive composition contains from about 6 to about 8 percent by weight of dicyandiamide as represented in Formula IV:

FORMULA IV

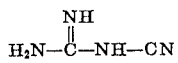

The subject composition likewise contains from about 0.6 to about 5 percent by weight of glycidoxypropyltrimethoxysilane as represented in Formula V:

FORMULA V

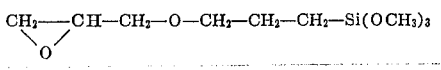

This component generally is thought to function as a coupling agent. This coupling effect generally results in a superior bond between the epoxy resin components and glass surfaces.

Finally, for purposes of adjusting the viscosity, the adhesive of this invention can contain from about 2 to about 8 percent by weight of finely divided silica powder.

In summary, the above specified adhesive composition is represented in Table I:

TABLE I

1. An epoxy resin of the bisphenol-A/epichlorohydrin type as represented by Formula I from about 45 to about 70 percent.
2. An epoxy resin of the bisphenol-A/epichlorohydrin type as represented by Formula II from about 5 to about 15 percent.
3. An epoxy resin of the polyglycol diepoxide type, as represented by Formula III from about 5 to about 30 percent.
4. Dicyandiamide from about 6 to about 8 percent.
5. Glycidoxypropyltrimethoxysilane from about 0.6 to about 5 percent.
6. Silica from about 2 to about 8 percent.

A preferred composition for minimum stress in accordance with this invention is as represented in Table II:

TABLE II 1. 47.5% of an epoxy resin of the bisphenol-A/epichlorohydrin type as represented by Formula I.
2. 12.9% of an epoxy resin of the bisphenol-A/epichlorohydrin type as represented by Formula II.
3. 25.7% of an epoxy resin of the polyglycol diepoxide type as represented by Formula III.
4. 6.9% of dicyandiamide.
5. 3.5% of glycidoxypropyltrimethoxysilane.
6. 3.5% of silica.

A preferred composition for maximum resistance to autoclaving and tolerable stress for stainless steel needles to glass syringe barrels is as represented in Table III.

TABLE III 1. 63.6% of an epoxy resin of the bisphenol-A/epichlorohydrin type as represented by Formula I.
2. 12.7% of an epoxy resin of the bisphenol-A/epichlorohydrin type as represented by Formula II.
3. 8.5% of an epoxy resin of the polyglycol diepoxide type as represented by Formula III.
4. 7.6% of a dicyandiamide.
5. .8% of a glycidoxypropyltrimethoxysilane.
6. 6.8% of a silica.

The above-specified adhesive composition is particularly advantageous in that it is a single component adhesive which is capable of providing a very high bond strength. The adhesive is well-suited for use in conjunction with glass as it is clear and it is flexible enough to take up the differential stress in glass with the result that breakage does not occur when the glass article is heated up to sterilizing temperatures. When this adhesive is used, strength is retained under both wet and dry sterilization conditions.

Upon application, the adhesive composition of this invention is cured by the application of heat. Curing can be effected by heating to from about 350° to about 500°F. A more preferred range of temperatures for the curing sequence is from about 375° to about 450°F. A most preferred curing sequence is 3 ½ minutes at 425°F.

It is understood by one skilled in the art that the exact curing sequence used is dependent on many variables such as the adhesive formulation, the quantity of adhesive used, the degree of cure desired, the mass of objects being joined, etc.

The subject adhesives can be prepared by any convenient method. However, it is preferred that the components be blended together and then milled to achieve homogeneity.

It is within the purview of this invention to add to the compositions of this invention compatible materials which do not affect the basic and novel characteristics of the composition of this invention. Among such materials are coloring agents, including dyes and pigments, fillers and similar additives. Additives such as antioxidants, antistatic agents, stabilizers and anti-foaming agents, may also be added. The upper limit of the quantity of additives is usually about 20 weight percent of the product.

The adhesives, as described above, can be used to secure composite objects where a strong, heat-resistant, water-resistant, clear, flexible bond is desired. However, the subject adhesives of this invention are particularly suited for use in securing stainless steel hypodermic needles to glass syringe barrels. When the adhesives are used for this purpose, the resulting composite product can be readily sterilized without detrimentally affecting the bond between the needles and the syringe barrel.

The following examples will illustrate the subject invention. These examples are given for the purpose of illustration and not for purposes of limiting this invention. All parts and percents of compositions are given by weight unless otherwise specified.

EXAMPLE 1

An adhesive composition in accordance with this invention was prepared by mixing 55 parts of the epoxy composition, as represented by Formula I, with 15 parts of the epoxy composition, as represented by Formula II, and 30 parts of the epoxy composition, as represented by Formula III. These components were mixed together and then gradually heated to 200°F. This temperature was maintained for 2 hours. During and while maintaining this heating sequence, the components were stirred regularly until a homogeneous blend was achieved. The resulting viscose liquid composition was then removed from the oven. While in the heated condition, 9 parts of silica, 8 parts of dicyanimide and 1 part of a silane, as represented by Formula V, were blended thereinto.

The resulting composition was then milled through a three-roll mill five times in order to thoroughly blend the components. The resulting composition was then cooled to room temperature.

For purposes of securing a stainless steel needle into each of a plurality of syringes the above-described epoxy composition was placed on the needle stem one-fourth inch from the end of each needle. Care was taken to make sure that the adhesive composition completely encompassed the outer periphery of the needle. Each needle was then placed in a syringe barrel, care being taken to make sure that the adhesive composition thoroughly wet the inner periphery of the syringe barrel orifice. The resulting epoxy base adhesive material was then cured by heating the syringe barrel-stainless steel needle composite to a temperature of 450°F. for 3 minutes and 15 seconds. At the end of this period of time, the epoxy composition was thoroughly cured and the stainless steel needle was secured in the syringe barrel. The resulting syringes were then allowed to cool to room temperature overnight.

These syringes were then tested by autoclaving and sterilizing for one hour at a pressure of 15 psi. Subsequent to autoclaving and sterilizing, the syringes were removed and allowed to dry for 48 hours. The tensile strength of the adhesive bond between the stainless steel needle and the syringe barrel was then tested by pulling the needles from the syringe barrel in a Twing-Albert Tensile Testing Machine as manufactured by Twing-Albert Instrument Co., Philadelphia, Pennsylvania. The average tensile value between the resulting stainless steel needles and the syringe barrels subsequent to autoclaving was 36.5 lbs.

EXAMPLE 2

In accordance with the description given in Example 1, an adhesive composition was prepared by mixing 65 parts of the epoxy composition, as represented by Formula I, with 15 parts of the epoxy composition, as represented by Formula II, and 20 parts of the epoxy composition, as represented by Formula III. This mixture was then heated and mixed as described in Example 1. To this mixture was then added 7 parts of silica, 8.7 of dicyanimide and 1 part of a silane, as represented by Formula V. Stainless steel needles having the resultant adhesive composition applied thereto in accordance with the manner of application in Example 1 were then assembled into syringe barrels, cured and tested in accordance with the description of Example 1. The average needle to syringe barrel tensile value of the resulting syringes was 31.6 lbs.

EXAMPLE 3

In accordance with the description given in Example 1, an adhesive composition was prepared comprising 75 parts of the epoxy material, as represented by Formula I, 10 parts of epoxy material, as represented by Formula II, and 15 parts of the epoxy material as represented by Formula III. To this mixture was added 7 parts of silica, 9 parts of dicyanimide and 1 part of a silane, as represented by Formula V. Needles having the resultant adhesive composition applied thereto in the manner of Example 1 were then secured into syringe barrels and cured in accordance with the curing procedure of Example 1. The average tensile value between the resulting stainless steel needles and the syringe barrels subsequent to autoclaving was 36.5 lbs.

EXAMPLE 4

By way of comparison, the adhesive compositions of this invention, as described in Examples 1-3, were compared with a prior art adhesive composition. The prior art adhesive composition, as used in accordance with this example, was formed by mixing 100 parts of an epoxy resin, as represented by Formula I, with 7 parts of silica. These compositions were then milled three times through a three-roll mill. A catalyst composition was prepared by mixing 100 parts of a polyamide hardener, which is the condensation product of a linoleic acid dimer and ethylene diamine as sold under the trademark Versamid 140 by the General Mills Corp. of Kankakee, Illinois, with four parts of a silane, as represented by Formula VI,

FORMULA VI

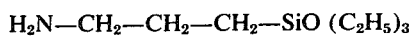

and 1 ½ parts silica. These components were likewise milled three times through a three-roll mill.

Equal parts of the above-described epoxy compositions and catalytic compositions were then mixed to form an adhesive composition. Stainless steel needles were then assembled into syringe barrels using this adhesive composition. The resulting needles were then cured and tested in accordance with the description given in Example 1, except that curing was effected at 350°F. The average needle to syringe barrel tensile value of the resultant syringes was 21.6 lbs.

What is claimed is:

1. In a hypodermic syringe assembly comprising a glass syringe barrel, a stainless steel hypodermic needle on one end of said syringe barrel and bonded thereto by the cured reaction product of an adhesive composition, the improvement wherein said adhesive compositon contains from about 45 to about 70 percent by weight of a first epoxy resin of the bisphenol-A/epichlorohydrin type having an $n$ value of about 0.5, from about 5 to about 15 percent by weight of a second epoxy resin of the bisphenol-A/epichlorohydrin type having an n value greater than that of said first epoxy resin, from about 5 to about 30 percent by weight of an epoxy resin of the polyglycol diepoxide type, from about 6 to about 8 percent by weight of dicyandiamide, from about 2 to about 8 percent by weight of silica, and from about 0.6 to about 5 percent by weight of glycidoxypropyltrimethoxysilane.

and wherein $n$ as a composite of both said first and second epoxy resins of the bisphenol-A/epichlorohydrin type is a value of from about 0.5 to about 1.5 and said polyglycol diepoxide resin has a formula:

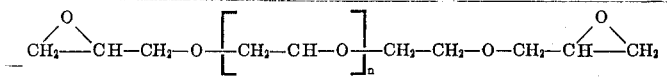

and wherein $n$ has a value of from 3 to 5.6.

5. In a hypodermic syringe as defined in claim 4, wherein said adhesive composition is curable at tem- 2. In a hypodermic syringe as defined in claim 1, wherein said second epoxy resin of the bisphenol-A/epichlorohydrin type has the formula:

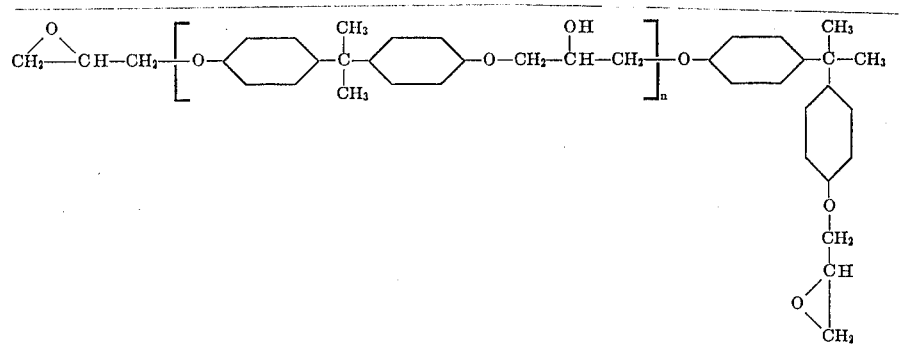

and wherein $n$ for said second epoxy resin of the bisphenol-A/epichlorohydrin type has a value of about 1.5.

3. In a hypodermic syringe as defined in claim 1, wherein said epoxy resin of the polyglycol diepoxide type has the formula:

peratures of from about 350° to about 500°F.

6. In a hypodermic syringe assembly comprising a glass syringe barrel, a stainless steel hypodermic needle on one end of said syringe barrel and bonded thereto by the cured reaction product of an adhesive composi-

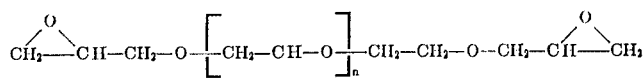

and wherein $n$ has a value of from 3 to 5.6.

4. In a hypodermic syringe assembly as defined in claim 1, wherein said first and second epoxy resins of the bisphenol-A/epichlorohydrin type have the formula:

tion, the improvement wherein said adhesive composition contains:

a. from about 45 to about 70 percent by weight of a first epoxy resin of the bisphenol-A/epichlorohydrin type having the formula:

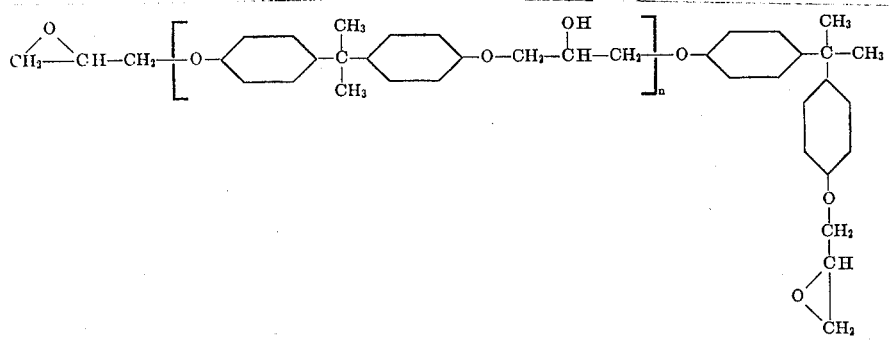

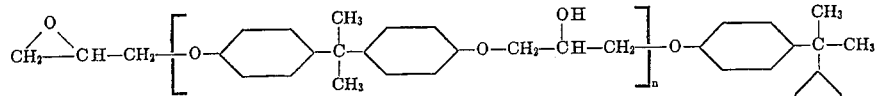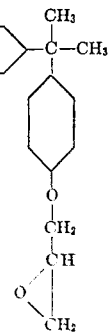

and wherein n is about 0.5;
b. from about 5 to about 15 percent by weight of a second epoxy resin of the bisphenol-A/epichlorohydrin type having the formula:

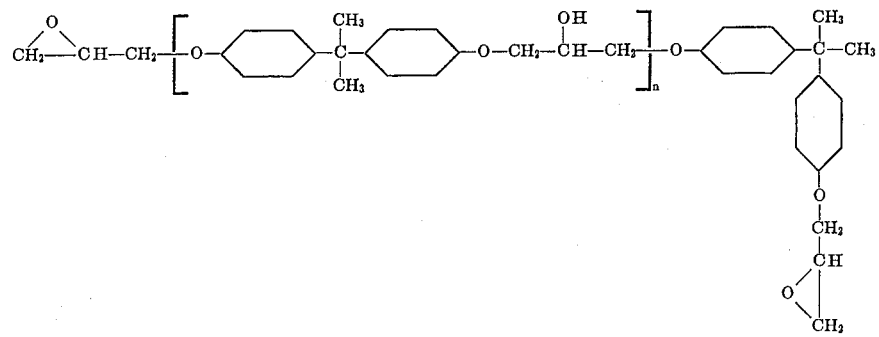

and wherein n is about 1.5;
c. from about 5 to about 30 percent by weight of an epoxy resin of the polyglycol diepoxide type having the formula:

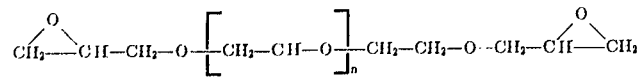

and wherein n has a value of from about 3 to about 5.6;
d. from about 0.6 to about 5 percent by weight of glycidoxypropyltrimethoxysilane;
e. from about 6 to about 8 percent by weight of dicyandiamide;
f. from about 2 to about 8 percent by weight of silica.

7. In a hypodermic syringe assembly as defined in claim 6, wherein said adhesive composition contains:
a. 47.5 percent by weight of said first epoxy resin of the bisphenol-A/epichlorohydrin type ;
b. 12.9 percent by weight of said second epoxy resin of the bisphenol-A/epichlorohydrin type;
c. 25.7 percent by weight of said epoxy resin of the polyglycol diepoxide type;
d. 3.5 percent by weight of glycidoxypropyltrimethoxysilane;
e. 6.9 percent by weight of dicyandiamide;
f. 3.5 percent by weight of silica.

8. In a hypodermic syringe assembly as defined in claim 6, wherein said adhesive composition contains:
a. 63.6 percent by weight of said first epoxy resin of the bisphenol-A/epichlorohydrin type;
b. 12.7 percent by weight of said second epoxy resin of the bisphenol-A/epichlorohydrin type;
c. 8.5 percent by weight of said epoxy resin of the polyglycol diepoxide type;
d. 7.6 percent by weight of glycidoxypropyltrimethoxysilane;
e. 0.8 percent by weight of dicyandiamide;
f. 6.8 percent by weight of silica.

* * * * *

UNITED STATES PATENT AND TRADEMARK OFFICE
CERTIFICATE OF CORRECTION

PATENT NO. : 3,788,321

DATED : January 29, 1974

INVENTOR(S) : Thomas D. Reither et al.

It is certified that error appears in the above-identified patent and that said Letters Patent are hereby corrected as shown below:

Col. 5, line 2, delete "EXAMPLE 1"; insert --EXAMPLE 1-- centered between lines 2 and 3. Col. 7, between line 55 and bottom of page, that portion of formula reading as follows:

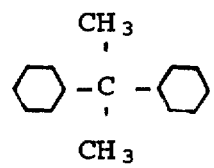

should be

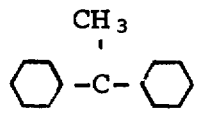

Signed and Sealed this

Twelfth Day of April 1977

[SEAL]

Attest:

RUTH C. MASON
Attesting Officer

C. MARSHALL DANN
Commissioner of Patents and Trademarks